US009802443B2

(12) United States Patent
Horiguchi

(10) Patent No.: US 9,802,443 B2

(45) Date of Patent: Oct. 31, 2017

(54) PNEUMATIC TIRE

(71) Applicant: SUMITOMO RUBBER INDUSTRIES, LTD., Kobe-shi, Hyogo (JP)

(72) Inventor: Takuya Horiguchi, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 443 days.

(21) Appl. No.: 13/963,175

(22) Filed: Aug. 9, 2013

(65) Prior Publication Data

US 2014/0283966 A1 Sep. 25, 2014

(30) Foreign Application Priority Data

Mar. 19, 2013 (JP) ................................ 2013-057066

(51) Int. Cl.
*B60C 11/00* (2006.01)
*B60C 11/04* (2006.01)
(Continued)

(52) U.S. Cl.
CPC .......... *B60C 11/033* (2013.01); *B60C 11/005* (2013.01); *B60C 11/04* (2013.01);
(Continued)

(58) Field of Classification Search
CPC ..... B60C 11/005; B60C 11/033; B60C 11/04; B60C 2011/0353; B60C 2011/1209; B60C 11/12
See application file for complete search history.

(56) References Cited

U.S. PATENT DOCUMENTS 4,444,236 A * 4/1984 Kan ...................... B60C 11/005 152/209.5
5,753,058 A * 5/1998 Fukumoto ........... B60C 11/0306 152/209.21
(Continued)

FOREIGN PATENT DOCUMENTS

EP 0 875 403 A2 11/1998
EP 2 514 608 A2 10/2012
(Continued)

OTHER PUBLICATIONS

Machine translation for Japan 2011-046299 (no date).*
(Continued)

*Primary Examiner* — Steven D Maki
(74) *Attorney, Agent, or Firm* — Birch, Stewart, Kolasch & Birch, LLP

(57) ABSTRACT

A pneumatic tire comprises a tread portion provided with a pair of crown main grooves and a pair shoulder main grooves to divide middle portions and shoulder portions, the tread portion having a contact surface covered with a cap rubber layer with a loss tangent of from 0.03 to 0.18, the middle portions provided with only middle lug grooves with groove widths within 2 mm, each middle lug groove extending from one end connected either the crown or shoulder main groove to the other end terminating within the middle portion, the middle lug grooves having an angle of from 40 to 55 degrees with respect to a tire circumferential direction, and each shoulder portion provided with first shoulder lateral grooves having axially inner ends connected to the shoulder main groove, wherein first shoulder lateral grooves consist of grooves having groove widths within 2 mm.

13 Claims, 6 Drawing Sheets

TW 20 22 23 Te 50 16 30 15 C 21 15 30 16 50 Te 1(2) A A 60 55 24i 24o 24 56 57 58 55 41 35 45 38 46 62 61 60 55 38 W1 W3 W5 W6 W4 41 W2

(51) Int. Cl.
*B60C 11/12* (2006.01)
*B60C 11/03* (2006.01)

(52) U.S. Cl.
CPC ....... *B60C 11/12* (2013.01); *B60C 2011/0025* (2013.01); *B60C 2011/0341* (2013.01); *B60C 2011/0344* (2013.01); *B60C 2011/0346* (2013.01); *B60C 2011/0348* (2013.01); *B60C 2011/0353* (2013.01); *B60C 2011/0381* (2013.01); *B60C 2011/0386* (2013.01); *B60C 2011/1209* (2013.01); *Y02T 10/862* (2013.01)

(56) References Cited

U.S. PATENT DOCUMENTS

2003/0101851 A1* 6/2003 Domange .......... B29D 30/0606 76/101.1
2005/0183807 A1* 8/2005 Hildebrand ......... B60C 11/0306 152/209.2
2006/0162832 A1* 7/2006 Stuhldreher ........ B60C 11/0306 152/209.18
2010/0314012 A1* 12/2010 Hada .................. B60C 11/0306 152/209.16
2012/0234442 A1 9/2012 Mayni
2012/0318420 A1* 12/2012 Sawai .................. B60C 11/042 152/209.15
2013/0092304 A1* 4/2013 Murata .................. B60C 11/12 152/209.18
2013/0167997 A1* 7/2013 Hayashi ................. B60C 11/04 152/209.18

FOREIGN PATENT DOCUMENTS

EP 2 537 688 A2 12/2012
JP 07-061209 A * 3/1995
JP 2003-29160 A 10/2003
JP 2011-046299 A * 3/2011
WO WO -2012/005187 A1 * 1/2012
WO WO 2012/005187 A1 1/2012

OTHER PUBLICATIONS

Machine translation for Japan 07-061209 (no date).*
European Search Report, dated Jul. 24, 2014, for European Application No. 13181262.0.

* cited by examiner

TW
Te
Te
1
3
3
4
4
5
5
6
6A
6B
6a
6b
6b
7
7A
7B
8
8
2(2s)
50
50
16
16
D3
D1
D2
30
30
35
35
15
15
TG
C
20
12
10
11

A
A
Te
Te
1(2)
TW
20
C
35
38
24i
24o
24
41
45
46
50
16
30
15
23
21
22
W1
W2
W3
W4
W5
W6
38
55
56
57
58
60
61
62

PNEUMATIC TIRE

BACKGROUND OF THE INVENTION

Field of the Invention

The present invention relates to a pneumatic tire having improved braking force while minimizing rolling resistance.

Description of the Related Art

Recent years, various pneumatic tires with low rolling resistance (LRR) have been proposed. Typically, conventional LRR tires tend to have low traveling performance such as steering stability and ride comfort.

Japanese patent application laid-open No. 2003-291610 discloses a pneumatic tire that has a tread rubber element with an improved rubber compound for improving steering stability and ride comfort with LRR. However, there is much room improvement as for braking force.

SUMMARY OF THE INVENTION

The present invention has been worked out in light of the circumstances described above, and has a main object of providing a pneumatic tire having improved braking force while minimizing rolling resistance.

In accordance with the present invention, there is provided a pneumatic tire comprising a tread portion having a tire equator, the tread portion being provided with a pair of circumferentially and continuously extending crown main grooves disposed axially both sides of the tire equator, a pair of circumferentially and continuously extending shoulder main grooves disposed axially outside of the crown main grooves, a pair of middle portions each of which is between the crown main groove and the shoulder main groove, and a pair of shoulder portions each of which is disposed axially outward of each shoulder main groove, the tread portion having a contact surface being covered with a cap rubber layer which is made of rubber having a loss tangent in a range of from 0.03 to 0.18, the middle portions being provided with only a plurality of middle lug grooves having groove widths in a range of not more than 2 mm, each middle lug groove extending from one end connected either the crown main groove or the shoulder main groove to the other end terminating within the middle portion, the middle lug grooves having an angle in a range of from 40 to 55 degrees with respect to a circumferential direction of the tire, and each shoulder portion being provided with a plurality of first shoulder lateral grooves having axially inner ends connected to the shoulder main groove, wherein said first shoulder lateral grooves consist of grooves having groove widths in a range of not more than 2 mm.

Preferably, the tread portion has a land ratio Sa/Sb in a range of from 0.65 to 0.75, wherein "Sa" is a net footprint area of the contact surface of the tread portion, and "Sb" is a gross footprint area including both the contact surface and whole grooves of the tread portion.

Preferably, a total groove width of crown main grooves and shoulder grooves is in a range of from 0.15 to 0.30 times with respect to a tread width.

Preferably, an axial maximum length of middle lug grooves is in a range of from 0.15 to 0.85 times with respect to a maximum axial length of the middle portion.

Preferably, the middle lug grooves include a first middle lug groove having the other end being connected to the crown main groove and a second middle lug groove having the other end being connected to the shoulder main groove, wherein a total length (L1+L2) of an axial length L1 of one said first middle lug groove and an axial length L2 of one said second middle lug grooves is in a range of from 0.4 to 1.2 times with respect to a maximum axial length of the middle portion.

Preferably, the first middle lug groove and the second middle lug groove are inclined in opposite direction each other.

Preferably, the middle lug grooves include a plurality of said first middle lug grooves spaced in the circumferential direction of the tire with first pitches, wherein the first pitches are in a range of from 0.5 to 2.0 times with respect to the maximum axial length of the middle portion.

Preferably, said middle lug grooves include a plurality of said second middle lug grooves spaced in the circumferential direction of the tire with second pitches, wherein the second pitches are in a range of from 0.5 to 2.0 times with respect to the maximum axial length of the middle portion.

DETAILED DESCRIPTION

Figure 1:
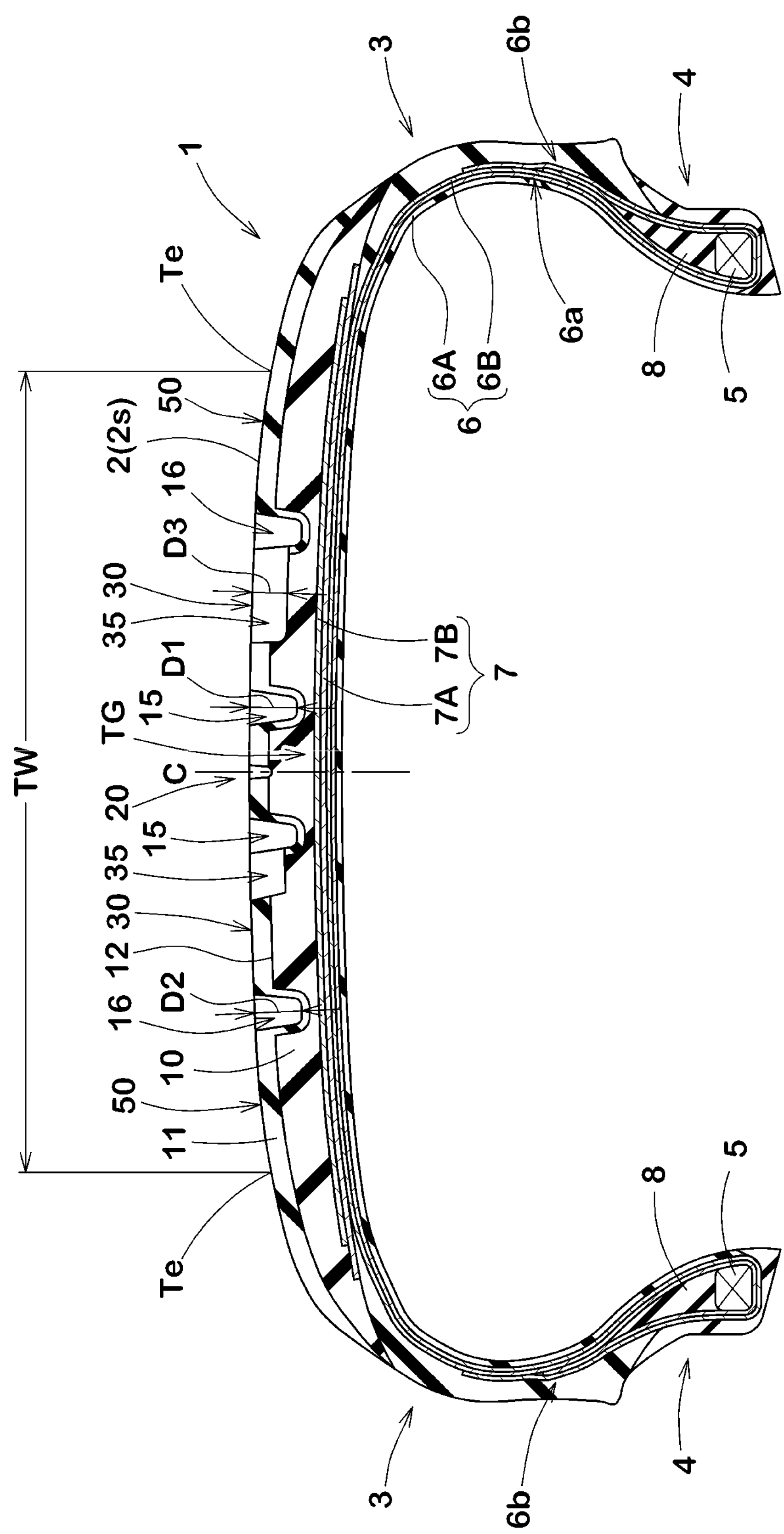
FIG. 1 is a cross sectional view of a pneumatic tire showing an embodiment of the present invention.

An embodiment of the present invention will be explained below with reference to the accompanying drawings. Before the present invention is described in detail, it should be noted that like elements are denoted by the same reference numerals throughout the disclosure.

FIG. 1 shows a cross sectional view of a pneumatic tire 1 under a normally inflated unloaded condition. The cross sectional view above is a view in which the tire 1 is cut along a line A-A in FIG. 2.

Here, the normally inflated unloaded condition is such that the tire 1 is mounted on a standard wheel rim and is inflate to a standard pressure but loaded with no tire load. In this application including specification and claims, various dimensions, positions and the like of the tire refer to those under the normally inflated unloaded condition of the tire unless otherwise noted.

The standard wheel rim means a wheel rim officially approved or recommended for the tire by standards organizations, the standard wheel rim is the "standard rim" specified in JATMA, the "Measuring Rim" in ETRTO, the "Design Rim" in TRA or the like, for example.

The standard pressure means the "maximum air pressure" in JATMA, the "Inflation Pressure" in ETRTO, and the maximum pressure given in the "Tire Load Limits at various Cold Inflation Pressures" table in TRA or the like.

Referring to FIG. 1, the tire 1 in accordance with the present embodiment comprises: a tread portion 2; a pair of sidewall portions 3 each of which extends radially inward from the axially outer end of the tread portion 2; a pair of bead portions 4 each of which is provided radially inside the sidewall portion 3 and has a bead core 5 therein; a carcass 6 extending between bead cores 5 through the tread portion 2 and sidewall portions 3; a pair of bead apex elements 8 each of which extends and tapers radially outwardly of the tire from the bead core 5; and a belt layer 7 disposed radially outward of the carcass 6 in the tread portion 2. In this embodiment, the tire 1, for example, is illustrated as a passenger vehicle tire.

The carcass 6 comprises two carcass plies 6A, 6B of cords which comprise a main portion 6*a* extending between bead cores 5, 5 through the tread portion 2 and sidewall portions 3, and a pair of turn-up portions 6*b* each turned up around the bead core 5 from axially inside to outside of the tire. The carcass cords are arranged at an angle in a range of from 70 to 90 degrees with respect to a tire equator C. For the carcass cords, organic fiber cords such as aramid or rayon cords may be used, for example.

The belt layer 7 comprises two belt plies 7A, 7B of belt cords laid at an angle of from 15 to 45 degrees with respect to the tire equator C so that each steel cord of plies is crossed. For the belt cords, steel cords or organic fiber cords may be used, for example.

The tread portion 2 includes a tread rubber element TG on the belt layer 7. The tread rubber TG comprises a base layer 10 and a cap layer 11 covering the base layer 10 to form a contact surface 2*s* of the tread portion 2.

The base layer 10 extends at least between tread edges Te, Te to cover the belt layer 7.

Here, the tread edges Te are the axial outermost edges of the ground contacting patch of the tire 1 which occurs under an normally inflated loaded condition when the camber angle of the tire is zero.

The abovementioned normally inflated loaded condition is such that the tire is mounted on the standard wheel rim and inflated to the standard pressure and loaded with a standard tire load. The standard load is the “maximum load capacity” in JATMA, the “Load Capacity” in ETRTO, and the maximum value given in the above-mentioned table in TRA or the like. In case of passenger car tires, however, the standard tire load is uniformly defined by 88% of the maximum tire load. The tread width TW shown in FIG. 1 is the width measured under the normally inflated unloaded condition, as the axial distance between the tread edges Te, Te determined as above.

The base layer 10, for example, is made of a rubber compound that includes butadiene rubber with syndiotactic-1,2-polybutadiene crystal. In order to minimize the rolling resistance maintaining tread rigidity, the rubber compound of the base layer 10 preferably has a complex elastic modulus E*2 of from 4.0 to 8.0 MPa and loss tangent of from 0.03 to 0.17.

Here, the complex elastic modulus (E*) and loss tangent (tanδ) were measured with a viscoelastic spectrometer of IWAMOTO SEISAKUSYO with the following measuring conditions: initial elongation 10%; amplitude of dynamic strain +/−2%; frequency 10 Hz; tensile deformation mode; and temperature 30 degrees Celsius.

The cap layer 11 is disposed radially outside the base layer 10. The cap layer 11 preferably has a volume Vc of 1.0 to 9.0 times with respect to the volume Vb of the base layer 10.

In order to minimize the rolling resistance while decreasing heat generation of the tread portion 2, the cap layer 11, for example, is made of a rubber compound having loss tangent (tanδ) of from 0.03 to 0.18. In case that loss tangent of the rubber compound of the cap layer 11 is less than 0.03, braking performance, ride comfort and durability of the tread portion 2 tend to deteriorate. In case that loss tangent of the rubber compound of the cap layer 11 is more than 0.18, rolling resistance tends to increase. In view of above, loss tangent of the rubber compound of the cap layer 11 is preferably in a range of not less than 0.06, more preferably not less than 0.09, but preferably not more than 0.15, more preferably not more than 0.12.

In order to improve braking performance by providing enhanced shearing resistance of the tread portion, the rubber compound of the cap layer 11 preferably has a complex elastic modulus E*1 in a range of from 4.0 to 8.0 MPa.

In order to improve rigidity of the tread portion 2 by preventing from a crack on a boundary between the cap and base layers 11, 10, a ratio tanδ1/E*1 is preferably approximate to a ratio tanθ2/E*2, wherein tanδ1 is loss tangent of rubber compound of cap layer 11, E*1 is the complex elastic modulus of rubber compound of cap layer 11, tanδ2 is loss tangent of rubber compound of base layer 10, and E*2 is the complex elastic modulus of rubber compound of base layer 12. More preferably, the cap and base layers 11, 10 have the relation as follows.

$$0.65 \leq (\tan\delta 1/E^*1)/(\tan\delta 2/E^*2) \leq 2.40$$

In case that the value of {(tanδ1/E*1)/(tanδ2/E*2)} is more than 2.40, it may be difficult to obtain LRR and improved braking performance due to high heat generation in the cap layer 11. On the other hand, in case that the value of {(tanδ1/E*1)/(tanδ2/E*2)} is less than 0.65, it may be difficult to obtain LRR due to high heat generation in the base layer 10.

Figure 2:
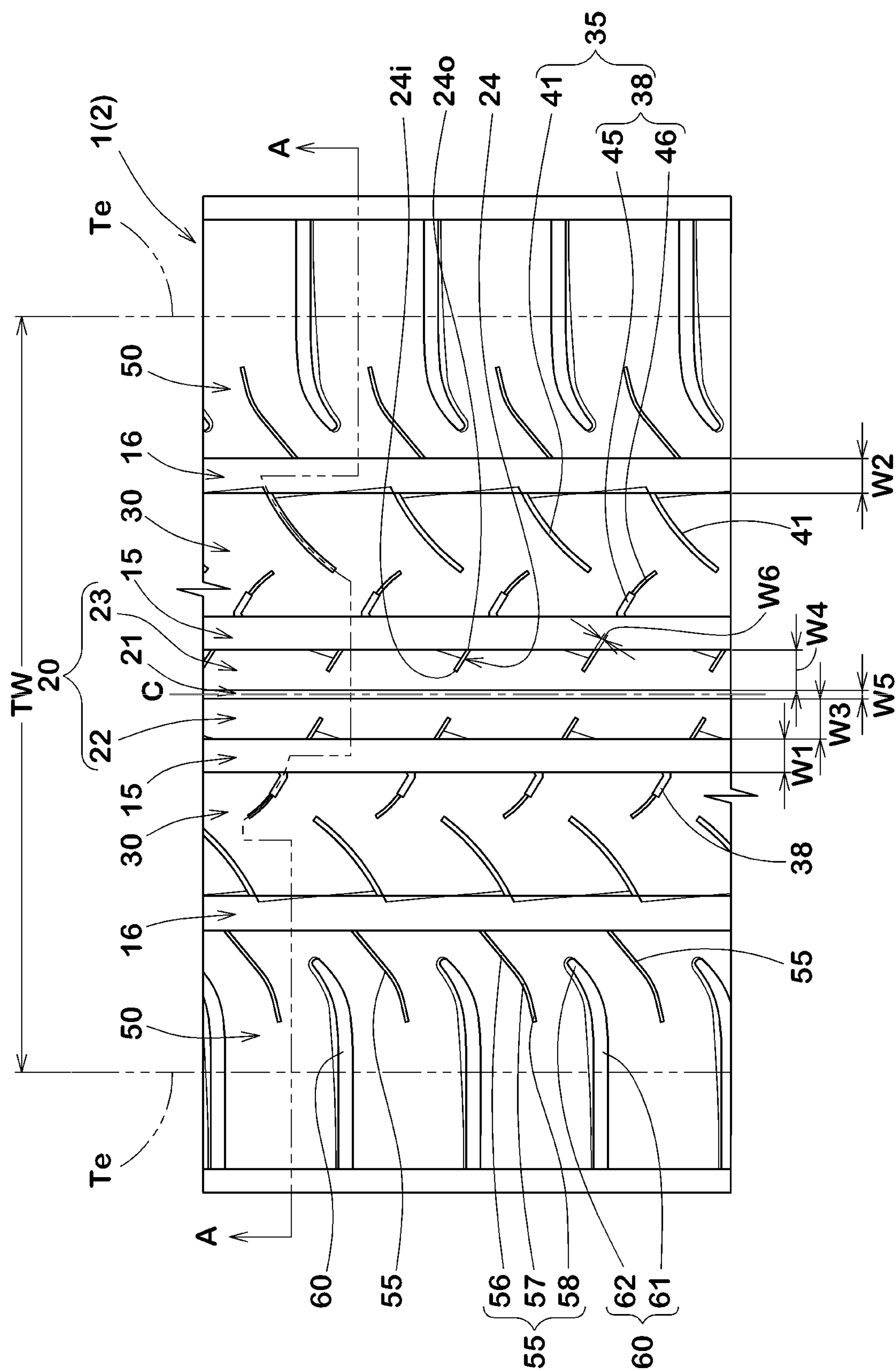
FIG. 2 is a development view of a tread portion of the tire shown in FIG. 1.

FIG. 2 shows a development view of the tread portion 2 of the tire 1 shown in FIG. 1. Referring to FIG. 2, the tread portion 2 is provided with a pair of circumferentially and continuously extending crown main grooves 15, 15 disposed axially both sides of the tire equator C and a pair of circumferentially and continuously extending shoulder main grooves 16, 16 disposed axially outsides of the crown main grooves 15. Thus, the tread portion 2 is divided into a crown portion 20 between crown main grooves 15, 15, a pair of middle portions 30, 30 each of which is between the crown main groove 15 and the shoulder main groove 16, and a pair of shoulder portions 50, 50 being disposed axially outward of the shoulder main grooves 16.

The tread portion 2 preferably has a land ratio Sa/Sb in a range of not less than 0.65, more preferably not less than 0.68, but preferably not more than 0.75, more preferably not more than 0.72, wherein “Sa” is a net footprint area of the contact surface 2*s* of the tread portion 2, and “Sb” is a gross footprint area including both the contact surface 2*s* and whole grooves of the tread portion 2. In case that the land ratio Sa/Sb tends is too small, braking performance or the like may deteriorate. On the other hand, if the land ratio Sa/Sb is too large, it may be difficult to obtain LRR.

In order to maintain drainage performance and braking performance of the tire, crown and shoulder main grooves 15, 16 preferably have groove widths W1, W2 in a range of from 3.0% to 6.0% of the tread width TW. Groove depths D1, D2 of the crown and shoulder main grooves 15, 16 are preferably in a range of from 6 to 12 mm.

Preferably, a total groove width of crown main grooves 15, 15 and shoulder grooves 16, 16 is in a range of from 0.15 to 0.30 times of the tread width TW, in order to improve dry road performance as well as wet performance.

A circumferentially extending crown narrow groove 21 is provided on the tire equator C so as to divide the crown portion 20 into a first crown portion 22 and a second crown portion 23.

The first and second crown portion 22, 23 extend in the circumferential direction of the tire with constant widths, respectively. The width W3 of the first crown portion 22 and width W4 of the second crown portion 23 are in a range of not less than 4.0%, more preferably not less than 4.5%, but preferably not more than 6.0%, more preferably not more than 5.5% of the tread width TW, in order to maintain rigidity of the crown portion 20 so that wet performance, steering stability, and ride comfort are improved.

The crown narrow groove 21 extends in straight manner with a constant groove width W5, for example. In order to improve wet performance while maintaining crown portion rigidity, the groove width W5 of crown narrow groove 21 is preferably in a range of not less than 0.20 times, more preferably not less than 0.23 times, but preferably not more than 0.30 times, more preferably not more than 0.27 times, with respect to the groove width W1 of the crown main groove 15.

The first and second crown portions 22, 23 are provided with a plurality of crown lug grooves 24, respectively. Each crown lug groove 24 has an axially outer end 24*o* being connected to the crown main groove 15 and the axially inner end 24*i* without reaching the crown narrow groove 21. The crown lug groove 24 has a groove width W6 in a range of not more than 2 mm. Since crown lug grooves 24 with a small groove width may close themselves on the road during braking, the apparent rigidity of crown portion 20 tends to be enhanced so as to reduce its deformation, whereby improves braking performance.

Figure 3:
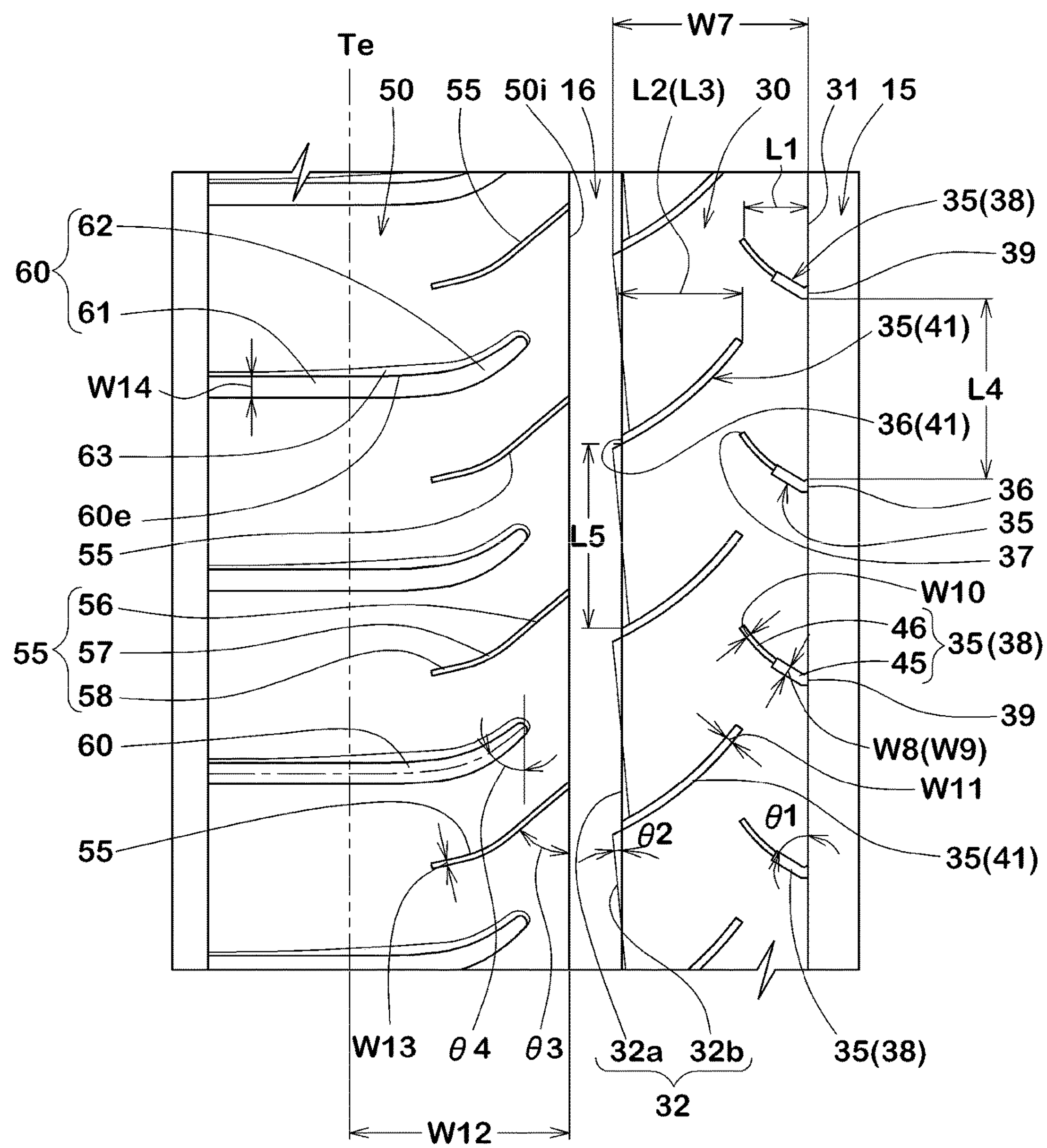
FIG. 3 is an enlarged view of a middle and shoulder portions of FIG. 2.

FIG. 3 shows an enlarged view of the middle portion 30 and the shoulder portion 50. Referring to FIG. 3, the middle portion 30 has a maximum width W7 in a range of from 0.15 to 0.25 times the tread width TW (shown in FIG. 2), for example. The middle portion 30 has an axially inner edge 31 that straightly extends in the circumferential direction of the tire. The middle portion 30 has an axially outer edge 32 that comprises a first edge 32*a* straightly extending in the circumferential direction of the tire and a second edge 32*b* inclined at angle of from 5 to 10 degrees with respect to the circumferential direction of the tire. The first edge 32*a* and the second edge 32*b* are alternately arranged in the circumferential direction of the tire, so that the axially outer edge 32 of the middle portion 30 extends in a zigzag manner. Thus, middle portion 30 may have improved rigidity and wet performance.

Each middle portion 30 is provided with only a plurality of middle lug grooves 35 having groove widths W8 in a range of not more than 2 mm. Each middle lug groove 35 extends from one end 36 being connected either the crown main groove 15 or the shoulder main groove 16 to the other end 37 terminating within the middle portion 30. Additionally, each middle lug grooves 35 have an angle θ1 in a range of from 40 to 55 degrees with respect to the circumferential direction of the tire.

Figure 4A:
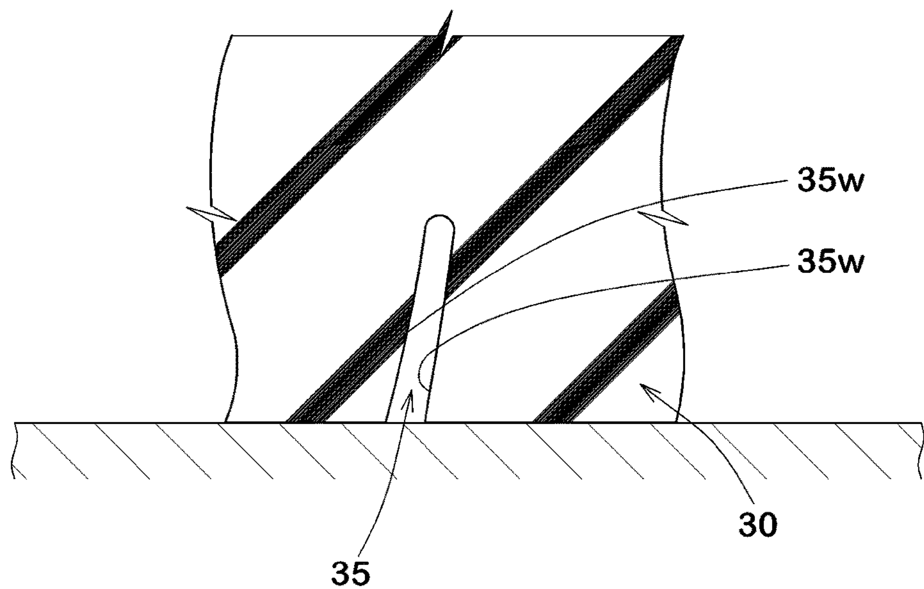
FIG. 4A is an enlarged cross sectional view of a middle lug groove during traveling at a constant speed.
Figure 4B:
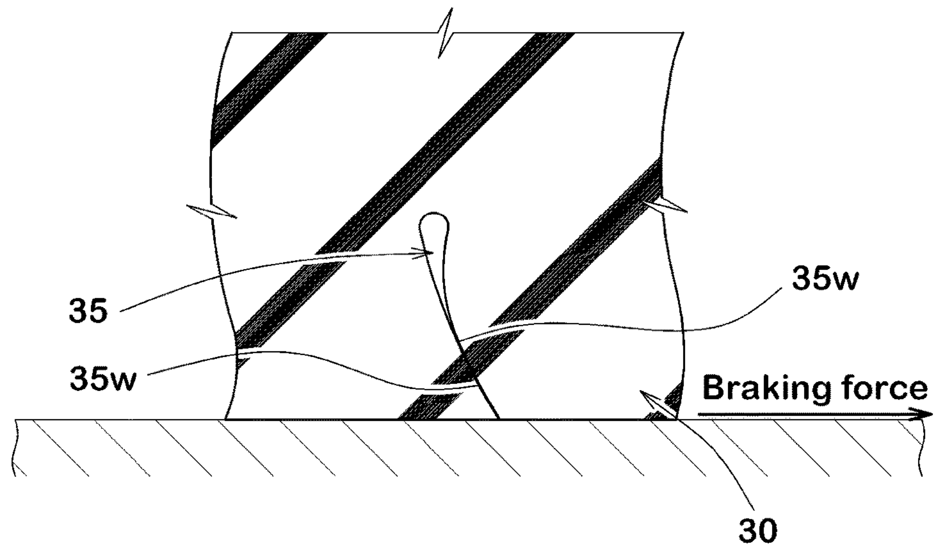
FIG. 4B is an enlarged cross sectional view of the middle lug groove during braking.

Such middle lug grooves 35 offers satisfactory ground contact area of the middle portion 30 for improving friction force against the road. FIG. 4A shows the longitudinal cross section of middle portion 30 during traveling with a constant speed, and FIG. 4B shows the same cross section above during braking. As shown in FIGS. 4A and 4B, since the middle lug groove 35 with the small groove width may close so that each groove wall 35W, 35W comes into contact each other during braking, the apparent rigidity of middle portion 30 tends to be enhanced so as to reduce its deformation, whereby improves braking performance.

In order to further improve braking performance while maintaining wet performance, a groove depth D3 of the middle lug groove 35 is preferably in a range of from not less than 0.60 times, more preferably not less than 0.65 times, but preferably not more than 0.80 times, more preferably not more than 0.75 times, with respect to the groove depth D1 (shown in FIG. 1) of the crown main groove 15.

Referring to FIG. 3, middle lug grooves 35 include a plurality of first middle lug grooves 38 each having the other end 39 being connected to the crown main groove 15 and a plurality of second middle lug groove 41 each having the other end 42 being connected to the shoulder main groove 16. Such first and second lug grooves 38, 41 may enhance rigidity of the middle portion 30 uniformly, whereby steering stability and wet performance are also improved.

In order to further enhance rigidity of the middle portion 30 uniformly, the first middle lug grooves 38 and the second middle lug grooves 41 are opposite in inclination direction.

Each first middle lug groove 38 comprises an axially inner part 45 having a groove with W9 and an axially outer part 49 having a groove width W10 smaller than the groove with W9. Thus, the middle portion 30 may maintain rigidity of the axially inner edge 31 so that braking performance is further improved.

A ratio W9/W10 of the groove width W9 of the axially inner and outer parts 45 to the groove width W10 of the axially outer part 49 is preferably in a range of from not less than 0.50, more preferably not less than 0.55, but preferably not more than 0.70, more preferably not more than 0.65. Thus, the first middle lug grooves 38 may drain the water into the crown main groove 15, whereby improve wet performance. In order to further improve the advantage above, an axial length L1 of the first middle lug groove 38 is preferably in a range of not less than 0.30 times, more preferably not less than 0.33 times, but preferably not more than 0.40 times, more preferably not more than 0.37 times, with respect to the maximum width W7 of the middle portion 30.

Preferably, each second middle lug grooves 41 is smoothly curved and has substantially constant groove width W11. The second middle lug groove 41 preferably has an axial length L2 in a range of not less than 0.60 times, more preferably not less than 0.63 times, but preferably not more than 0.70 times, more preferably not more than 0.67 times, with respect to the maximum width W7 of the middle portion 30, in order to effectively disperse the water from under the middle portion 30.

The axial length L2 of the second middle lug groove 41 corresponds to the maximum axial length L3 in middle lug grooves 35. In order to further improve wet performance and steering stability, the maximum axial length L3 is preferably in a range of not less than 0.15 times, more preferably not less than 0.30 times, but preferably not more than 0.85, more preferably not more than 0.70 times, with respect to the maximum width of the middle portion 30.

In order to further improve wet performance as well as braking performance, the total axial length (L1+L2) of the axial length L1 of one first middle lug groove 38 and the axial length L2 of one second middle lug groove 41 is preferably in a range of not less than 0.40 times, more preferably not less than 0.60 times, but preferably not more than 1.20 times, more preferably not more than 1.00 times, with respect to the maximum width W7 of the middle portion 30.

The first middle lug grooves 38 are spaced in the circumferential direction of the tire with first pitches L4, wherein the first pitches L4 are preferably in a range of not less than 0.50 times, more preferably not less than 1.0 times, but preferably not more than 2.0 times, more preferably not more than 1.5 times, with respect to the maximum axial length W7 of the middle portion 30, in order to further improve durability of middle portion 30 as well as wet performance.

Similarly, the second middle lug grooves 41 are spaced in the circumferential direction of the tire with second pitches L5, wherein the second pitches L5 are preferably in a range of not less than 0.50 times, more preferably not less than 1.0 times, but preferably not more than 2.0 times, more preferably not more than 1.5 times, with respect to the maximum axial length W7 of the middle portion 30.

Each shoulder portion 50 has an axial width W12, which is between an axially inner edge 50*i* thereof and the tread edge Te, in a range of from 0.14 to 0.22 times, with respect to the tread width TW.

The shoulder portion 50 is provided with a plurality of first shoulder grooves 55 and a plurality of second shoulder grooves 60, which are alternately arranged in the circumferential direction of the tire.

The first shoulder grooves 55 have axially inner ends that are connected to the shoulder main groove 16, wherein first shoulder grooves 55 consist of grooves having groove widths W13 in a range of not more than 2 mm. Thus, the first shoulder grooves 55 with small groove widths may close so that each groove walls come into contact each other during braking, the apparent rigidity of shoulder portion 50 tends to be enhanced so as to reduce its deformation, whereby further improves braking performance.

As mentioned above, the tire 1 in accordance with the present invention may obtain satisfactory contact area on both crown and shoulder portions 30, 50. Additionally, since the middle lug grooves 35 and the first shoulder grooves 55 having small groove widths may close so that each groove walls come into contact each other during braking, the apparent rigidity of middle and shoulder portions 30, 50 tend to be enhanced so as to reduce deformation, whereby improves braking performance.

In this embodiment, each first shoulder groove 55 comprises an axially inner portion 56 that straightly extends from the shoulder main groove 16 toward the tread edge Te, an axially outer portion 58 that straightly extends toward the shoulder main groove 16 from the axially outer end thereof, and a smoothly curved portion 57 that connects therebetween. Thus, such first shoulder grooves 55 are able to easily close themselves due to braking force in the ground contact patch such that rigidity of the shoulder portion 50 is effectively enhanced.

Each first shoulder groove 55 preferably has an angle θ3 in a range of from not less than 40 degrees, more preferably not less than 45 degrees, but preferably not more than 55 degrees, more preferably not more than 50 degrees, with respect to the circumferential direction of the tire. In case that the angle θ3 of the first shoulder groove 55 is too small, steering stability of the tire tends to deteriorate, due to low lateral rigidity of the shoulder portion 50. In case that the angle θ3 is too large, braking performance of the tire tends to deteriorate, due to low circumferential rigidity of the shoulder portion 50.

Each second shoulder grooves 60 comprises an axially outer portion 61 and an axially inner portion 62. The axially outer portion 61 straightly extends along the axial direction of the tire, for example. The axially inner portion 62 smoothly curves, for example. Such second shoulder grooves 60 improvers wet performance while maintaining rigidity of the shoulder portion 50.

In order to further improve wet performance while maintaining rigidity of the shoulder portion 50, the axially outer portion 61 of the second shoulder groove 60 preferably has a constant groove width W14 in a range of not less than 0.35 times, more preferably not less than 0.40 times, but preferably not more than 0.55 times, more preferably not more than 0.50 times, with respect to the groove width of the shoulder main groove 16.

The axially inner portion 62 of the second shoulder groove 60 has an axially inner end that terminates within the shoulder portion 50. The axially inner portion 62 preferably has an angle θ4 in a range of not less than 40 degrees, more preferably not less than 45 degrees, but preferably not more than 55 degrees, more preferably not more than 50 degrees, with respect to the circumferential direction of the tire. In case that the angle θ4 is too small, it would be difficult to disperse the water from under the shoulder portion 50. In case that the angle θ4 is too large, braking performance wet performance of the tire tends to deteriorate.

A chamfer portion 63 is preferably provided on an edge 60*e* between a groove wall of the second shoulder groove 60 and the tread contact surface, for preventing a stone coming into the second shoulder groove 60.

Figure 5:
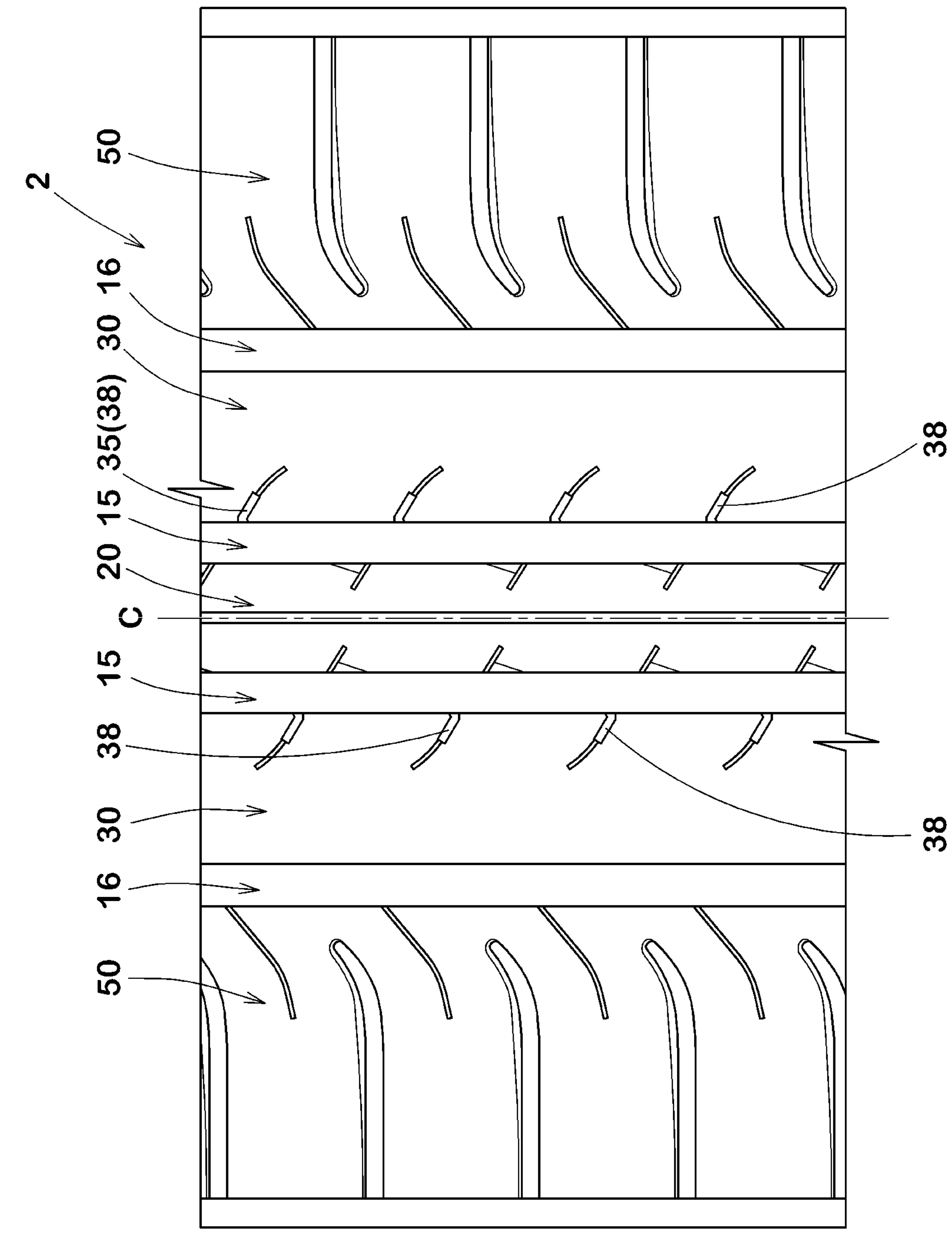
FIG. 5 is a development view of a tread portion in accordance with another embodiment of the invention.

FIG. 5 shows a development view of the tread portion 2 in accordance with another embodiment of the invention. Referring to FIG. 5, the middle lug grooves 35 consist of plurality of first middle lug grooves 38 to enhance axially outside rigidity of middle portion 30 so that steering stability is further improved.

Figure 6:
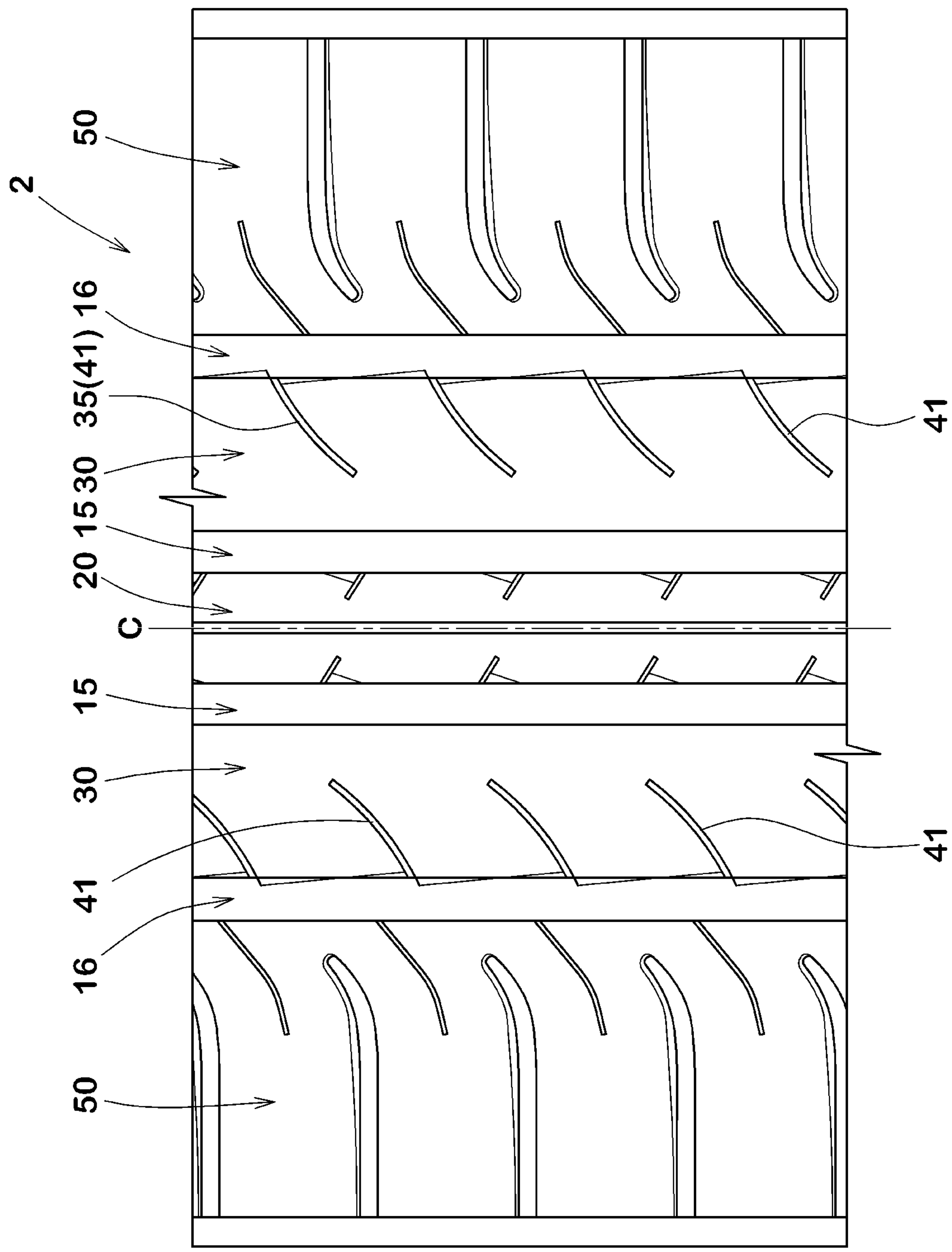
FIG. 6 is a development view of a tread portion in accordance with still further embodiment of the invention.

FIG. 6 shows a development view of the tread portion 2 in accordance with still further embodiment of the invention. Referring to FIG. 6, the middle lug grooves 35 consist of plurality of second middle lug grooves 41 to enhance axially inside rigidity of middle portion 30.

The present invention is more specifically described and explained by means of the following Examples and References. However, it should be understood that the present invention is not limited to embodiments as mentioned above and Examples described later.

Comparison Test

Passenger car pneumatic tires having a size of 225/50R17 with basic tread patterns of FIG. 2, FIG. 5 or FIG. 6 except for details shown in Table 1 were made and tested with respect to rolling resistance, braking performance, steering stability, and ride comfort. The major common specifications of tires are as follows.

Crown main groove depth D1: 8.5 mm

Shoulder main groove depth D2: 8.5 mm

Land ration Sa/Sb: 0.65 to 0.75

Test methods are as follows.

Rolling Resistance Test:

The test tire was mounted on a rim of 7J×17 and inflated to an internal pressure of 240 kPa, and the rolling resistance of each tire was measured using a tester at a speed of 80 km/hr with a tire load of 5 kN. The rolling resistance is shown in Table 1 by an index based on Ref. 1 being 100, wherein the smaller the index number, the better the rolling resistance is.

Braking Performance Test:

The test tires were installed in a front wheel test drive car as whole wheels using the rim of 7J×17 and an internal pressure of 240 kPa. The test car was driven on an asphalt road with a wet surface having a 2.0 mm depth of water and was suddenly braked at a speed of 100 km/hr. The braking distance of each tire was measured. The results are shown with an index based on Ref. 1 being 100. The smaller the value, the better the braking performance is.

Steering Stability and Ride Comfort Test:

The test car as mentioned above was driven on an asphalt road with a dry surface and was evaluated its steering stability and ride comfort by driver's feeling. The results are shown with an index based on Ref. 1 being 100, respectively. The larger the value, the better performances are, respectively. Table 1 shows the test results.

TABLE 1

| | Ref. 1 | Ref. 2 | Ref. 3 | Ref. 4 | Ref. 5 | Ex. 1 | Ex. 2 | Ex. 3 | Ex. 4 | Ex. 5 | Ex. 61 |
|---|---|---|---|---|---|---|---|---|---|---|---|
| Tread pattern | FIG. 2 | FIG. 2 | FIG. 2 | FIG. 2 | FIG. 2 | FIG. 2 | FIG. 2 | FIG. 2 | FIG. 2 | FIG. 2 | FIG. 2 |
| Loss tangent of cap layer (tanδ1) | 0.27 | 0.15 | 0.19 | 0.15 | 0.15 | 0.15 | 0.03 | 0.18 | 0.15 | 0.15 | 0.15 |
| Complex elastic modulus of cap layer E*1 (MPa) | 8.5 | 7 | 7 | 7 | 7 | 7 | 7 | 7 | 7 | 7 | 7 |
| Loss tangent of base layer (tanδ2) | 0.11 | 0.11 | 0.11 | 0.11 | 0.11 | 0.11 | 0.11 | 0.11 | 0.11 | 0.11 | 0.11 |
| Complex elastic modulus of base layer E*2 (MPa) | 4.8 | 4.8 | 8 | 8 | 8 | 8 | 8 | 8 | 8 | 8 | 8 |
| Volume ratio Vc/Vb | 2.3 | 2.3 | 2.3 | 2.3 | 2.3 | 2.3 | 2.3 | 2.3 | 2.3 | 2.3 | 2.3 |
| Complex elastic modulus ratio E*1/E*2 | 1.77 | 1.46 | 0.88 | 0.88 | 0.88 | 0.88 | 0.88 | 0.88 | 0.88 | 0.88 | 0.88 |
| Ratio (tanδ1/E*1)/(tanδ2/E*2) | 1.39 | 0.94 | 1.97 | 1.56 | 1.56 | 1.56 | 0.31 | 1.87 | 1.56 | 1.56 | 1.56 |
| Middle lug groove width W8 (mm) | 3 | 3 | 1 | 1 | 1 | 1 | 1 | 1 | 2 | 1 | 1 |
| Middle lug groove angle θ1 (deg.) | 50 | 50 | 50 | 35 | 60 | 50 | 50 | 50 | 50 | 40 | 55 |
| Shoulder groove width W13 (mm) | 3 | 3 | 1 | 1 | 1 | 1 | 1 | 1 | 2 | 1 | 1 |
| Ratio (L1 + L2)/W7 | 0.6 | 0.6 | 0.6 | 0.6 | 0.6 | 0.6 | 0.6 | 0.6 | 0.6 | 0.6 | 0.6 |
| Wt/TW | 0.2 | 0.2 | 0.2 | 0.2 | 0.2 | 0.2 | 0.2 | 0.2 | 0.2 | 0.2 | 0.2 |
| Ratio L4/W7 | 1 | 1 | 1 | 1 | 1 | 1 | 1 | 1 | 1 | 1 | 1 |
| Ratio L5/W7 | 1 | 1 | 1 | 1 | 1 | 1 | 1 | 1 | 1 | 1 | 1 |
| Rolling resistance (Index) | 100 | 82 | 88 | 85 | 85 | 82 | 64 | 85 | 82 | 82 | 82 |
| Braking performance (Index) | 100 | 110 | 108 | 107 | 110 | 100 | 90 | 108 | 103 | 103 | 103 |
| Steering stability (Index) | 100 | 100 | 110 | 110 | 110 | 110 | 95 | 100 | 100 | 107 | 112 |
| Ride comfort (Index) | 100 | 110 | 98 | 100 | 100 | 100 | 95 | 115 | 110 | 103 | 98 |

| | Ex. 7 | Ex. 8 | Ex. 9 | Ex. 10 | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|---|---|---|---|
| Tread pattern | FIG. 2 | FIG. 2 | FIG. 2 | FIG. 2 | FIG. 2 | FIG. 2 | FIG. 2 | FIG. 2 | FIG. 2 | FIG. 2 | FIG. 2 | FIG. 5 | FIG. 6 |
| Loss tangent of cap layer (tanδ1) | 0.15 | 0.15 | 0.15 | 0.15 | 0.15 | 0.15 | 0.15 | 0.15 | 0.15 | 0.15 | 0.15 | 0.15 | 0.15 |
| Complex elastic modulus of cap layer E*1 (MPa) | 7 | 7 | 7 | 7 | 7 | 7 | 7 | 7 | 7 | 7 | 7 | 7 | 7 |
| Loss tangent of base layer (tanδ2) | 0.11 | 0.11 | 0.11 | 0.11 | 0.11 | 0.11 | 0.11 | 0.11 | 0.11 | 0.11 | 0.11 | 0.11 | 0.11 |
| Complex elastic modulus of base layer E*2 (MPa) | 8 | 8 | 8 | 8 | 8 | 8 | 8 | 8 | 8 | 8 | 8 | 8 | 8 |
| Volume ratio Vc/Vb | 2.3 | 2.3 | 2.3 | 2.3 | 2.3 | 2.3 | 2.3 | 2.3 | 2.3 | 2.3 | 2.3 | 2.3 | 2.3 |
| Complex elastic modulus ratio E*1/E*2 | 0.88 | 0.88 | 0.88 | 0.88 | 0.88 | 0.88 | 0.88 | 0.88 | 0.88 | 0.88 | 0.88 | 0.88 | 0.88 |
| Ratio (tand1/E*1)/(tand2/E*2) | 1.56 | 1.56 | 1.56 | 1.56 | 1.56 | 1.56 | 1.56 | 1.56 | 1.56 | 1.56 | 1.56 | 1.56 | 1.56 |
| Middle lug groove width W8 (mm) | 1 | 1 | 1 | 1 | 1 | 1 | 1 | 1 | 1 | 1 | 1 | 1 | 1 |
| Middle lug groove angle θ1 (deg.) | 50 | 50 | 50 | 50 | 50 | 50 | 50 | 50 | 50 | 50 | 50 | 50 | 50 |
| Shoulder groove width W13 (mm) | 1 | 1 | 1 | 1 | 1 | 1 | 1 | 1 | 1 | 1 | 1 | 1 | 1 |
| Ratio L1 + L2/W7 | 0.6 | 0.6 | 0.6 | 0.6 | 0.35 | 0.4 | 1.2 | 1.25 | 0.6 | 0.6 | 0.6 | 0.33 | 0.66 |
| Wt/TW | 0.1 | 0.15 | 0.3 | 0.35 | 0.2 | 0.2 | 0.2 | 0.2 | 0.2 | 0.2 | 0.2 | 0.2 | 0.2 |
| Ratio L4/W7 | 1 | 1 | 1 | 1 | 1 | 1 | 1 | 1 | 0.5 | 2 | 2.5 | 1 | — |
| Ratio L5/W7 | 1 | 1 | 1 | 1 | 1 | 1 | 1 | 1 | 0.5 | 2 | 2.5 | — | 1 |
| Rolling resistance (Index) | 86 | 82 | 82 | 80 | 82 | 82 | 82 | 82 | 82 | 85 | 82 | 82 | 82 |
| Braking performance (Index) | 97 | 100 | 100 | 102 | 101 | 100 | 103 | 105 | 103 | 105 | 99 | 107 | 107 |
| Steering stability (Index) | 114 | 112 | 110 | 108 | 100 | 100 | 100 | 95 | 110 | 110 | 110 | 115 | 115 |
| Ride comfort (Index) | 97 | 97 | 100 | 100 | 110 | 110 | 110 | 115 | 110 | 105 | 95 | 98 | 98 |

From the test results, it was confirmed that tires in accordance with the present invention can be effectively minimizing the rolling resistance, maintaining braking performance compared to references.

The invention claimed is:

1. A pneumatic tire comprising:

a tread portion having a tire equator and axially outer tread edges, the tread portion being provided with:

a pair of circumferentially and continuously extending crown main grooves disposed axially both sides of the tire equator;

a pair of circumferentially and continuously extending shoulder main grooves disposed axially outside of the crown main grooves;

a pair of middle portions each of which is between the crown main groove and the shoulder main groove; and a pair of shoulder portions each of which is disposed axially outward of each shoulder main groove, the tread portion having a contact surface being covered with a cap rubber layer which is made of rubber having a loss tangent in a range of from 0.03 to 0.18, the middle portions being provided with only a plurality of middle lug grooves having groove widths in a range of not more than 2 mm, each middle lug groove extending from one end connected to either the crown main groove or the shoulder main groove to the other end terminating within the middle portion, the middle lug grooves having an angle in a range of from 40 to 55 degrees with respect to a circumferential direction of the tire, the middle lug grooves comprising first middle lug grooves having said one end connected to the crown main groove with the first middle lug grooves comprising an axially inner groove portion having a constant groove width W9 and an axially outer groove portion having a constant groove width W10 that is smaller than the groove width W9, wherein a ratio W10/W9 of the groove width W10 to the groove width W9 is in a range of from 0.50 to 0.70, and wherein the axially inner groove portion extends at an angle larger than that of the axially outer groove portion with respect to the circumferential direction of the tire, and each shoulder portion being provided with a plurality of first shoulder lateral grooves having axially inner ends connected to the shoulder main groove, having axially outer ends terminating within the shoulder portion without reaching the tread edge, and having groove widths in a range of not more than 2 mm.

2. The tire according to claim 1, wherein the tread portion has a land ratio Sa/Sb in a range of from 0.65 to 0.75, wherein "Sa" is a net footprint area of the contact surface of the tread portion, and "Sb" is a gross footprint area including both the contact surface and whole grooves of the tread portion.

3. The tire according to claim 1, wherein a total groove width of crown main grooves and shoulder grooves is in a range of from 0.15 to 0.30 times with respect to the tread width.

4. The tire according to claim 1, wherein an axial maximum length of middle lug grooves is in a range of from 0.15 to 0.85 times with respect to a maximum axial length of the middle portion.

5. The tire according to claim 1, wherein the middle lug grooves include a second middle lug groove having said one end being connected to the shoulder main groove, and a total length (L 1 +L2) of an axial length L1 of one said of said first middle lug grooves and an axial length L2 of one of said second middle lug grooves is in a range of from 0.4 to 1.2 times with respect to a maximum axial length of the middle portion.

6. The tire according to claim 5, wherein the first middle lug groove and the second middle lug groove are inclined in a direction opposite to each other.

7. The tire according to claim 5, wherein said middle lug grooves include a plurality of said second middle lug grooves spaced in the circumferential direction of the tire with second pitches, and the second pitches are in a range of from 0.5 to 2.0 times with respect to the maximum axial length of the middle portion.

8. The tire according to claim 1, wherein said middle lug grooves include a plurality of said first middle lug grooves spaced in the circumferential direction of the tire with first pitches, and the first pitches are in a range of from 0.5 to 2.0 times with respect to the maximum axial length of the middle portion.

9. The tire according to claim 1, wherein the middle lug grooves have a groove depth D3 reaching a base layer disposed radially inward of the cap rubber layer.

10. The tire according to claim 1, wherein the axially inner groove portion of the first middle lug groove has a length shorter than that of the axially outer groove portion of the first middle lug groove.

11. The tire according to claim 1, wherein the middle lug grooves include a second middle lug groove having said one end being connected to the shoulder main groove, the axially outer groove portion of the first middle lug groove is arranged so as to overlap with the second middle lug groove in the circumferential direction of the tire, and the axially inner groove portion of the first middle lug groove is arranged not to overlap with the second middle lug groove in the circumferential direction of the tire.

12. The tire according to claim 11, wherein the axially outer groove portion of the first middle lug groove is arranged so as to overlap with the second middle lug groove in the axial direction of the tire, and the axially inner groove portion of the first middle lug groove is arranged not to overlap with the second middle lug groove in the axial direction of the tire.

13. The tire according to claim 1, wherein the middle lug grooves include a second middle lug groove having said one end being connected to the shoulder main groove, the axially outer groove portion of the first middle lug groove is arranged so as to overlap with the second middle lug groove in the axial direction of the tire, and the axially inner groove portion of the first middle lug groove is arranged not to overlap with the second middle lug groove in the axial direction of the tire.

* * * * *